Dec. 16, 1941.  C. M. OSTERHELD  2,266,246
OFF-PEAK WATER HEATING SYSTEM
Filed Nov. 7, 1940
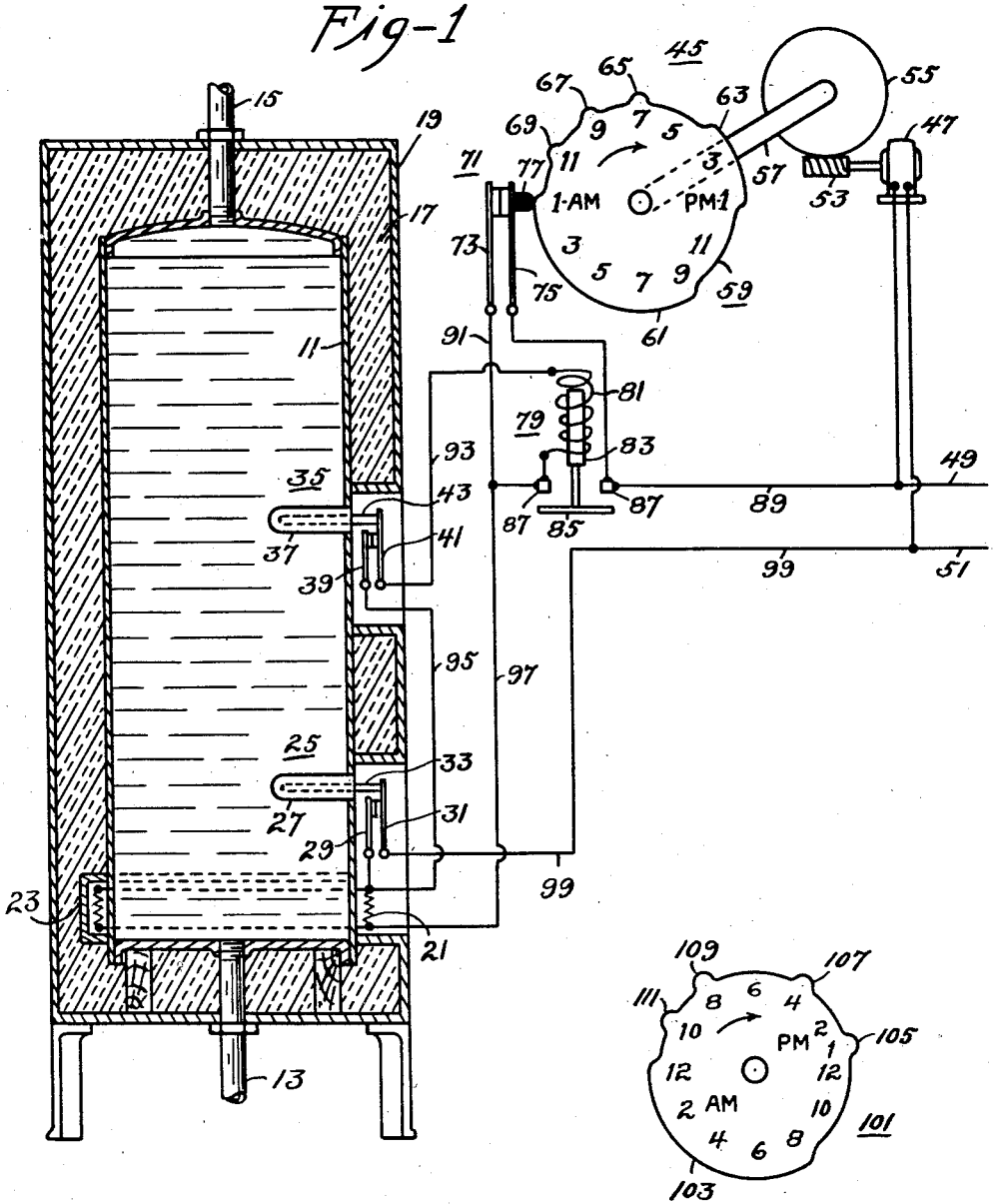
INVENTOR
CLARK M. OSTERHELD
BY
ATTORNEY Patented Dec. 16, 1941

2,266,246

UNITED STATES PATENT OFFICE 2,266,246

OFF-PEAK WATER HEATING SYSTEM

Clark M. Osterheld, Stoughton, Wis., assignor to McGraw Electric Company, Elgin, Ill., a corporation of Delaware Application November 7, 1940, Serial No. 364,638

6 Claims. (Cl. 219—39)

My invention relates to electric water heating systems and particularly to off-peak water heating systems.

An object of my invention is to provide a relatively simple time-controlled means for energizing either momentarily or continuously for a fixed length of time, the control element of a hot water electric heating system.

Another object of my invention is to provide a timing means adapted to be positioned relatively closely to a hot water tank, such as may be used in domestic installations, and effective to energize a control element to ensure that a predetermined fractional part of the water content of the tank shall be hot during the daylight hours and that substantially all of the water in the tank shall be hot at the start of the daylight period.

Other objects of my invention will either be apparent from a description of my invention or will be pointed out hereinafter, particularly in the appended claims.

In the single sheet of drawings,

Figure 1 is a schematic diagram of connections of a system embodying my invention, shown as applied to the usual domestic hot water tank, and, Fig. 2 is a view in front elevation of a modified form of one part of the device particularly embodying my invention.

My system is shown as operatively associated with an ordinary hot water tank 11 having a cold water inlet pipe 13 connected thereto at its bottom end and a hot water outlet pipe 15 connected thereto at its upper end. I may provide a mass 17 of heat-insulating material surrounding the tank 11 and held in place by an outer casing 19. All of these elements are old and well known in the art and form no part of my present invention.

I provide an electric heater 21 which, for simplicity's sake, is shown as being positioned on the tank 11 near the bottom end thereof and this heater may be positioned in a tunnel or annular housing 23 and, for illustrative purposes only, I may here state that one form of such electric heater and its support in a tunnel 23 is disclosed and claimed in my Patent No. 2,226,526 issued December 24, 1940. I do not, however, desire to be limited to this specific form of electric heating element and its mounting on the tank.

I provide a main thermal heater control switch 25 responsive to the temperature of the water in the lower part of the tank and here shown, for illustrative purposes, as comprising a tubular member 27 secured to the wall of the tank 11 in a fluid-tight manner, to be positioned within the tank. The switch includes also a substantially rigid contact arm 29 and a resilient contact arm 31 which latter is normally yieldingly biased into engagement with arm 29 but is adapted to be moved out of engagement therewith by an expansion rod 33 positioned in the tubular member 27. While I have shown a specific form of thermal switch I do not desire to be limited thereto since any other thermally actuable switch responsive to tank water temperature may be used instead of the form shown.

I wish to point out also that while I have shown given positions of the thermal switch and of the single heater, I do not desire to be limited thereto and the thermal switch 25 is to be considered as being effective to cause disengagement of contact arms 31 and 29 when substantially all of the water in the tank is hot.

For purposes which will hereinafter appear, I provide an upper auxiliary thermal switch 35 including a tubular member 37, a relatively rigid contact arm 39, a resilient contact arm 41 normally yieldingly biased into engagement with arm 39 but adapted to be moved out of engagement therewith by the action of an expansion rod 43 positioned in the tubular member 37. The general construction and operation of the thermal switch 35 is substantially the same as that of the main thermal switch 25, the main difference being, of course, that the auxiliary thermal switch 35 will interrupt the engagement of arms 39 and 41 when it is subject to the temperature of hot water at an upper part of the tank. While I have shown the thermal switch 35 as positioned substantially at half the height of the tank, I do not desire to be limited thereto, since it may be mounted in the upper one-third part of the tank or somewhat lower than the position in which it is shown so that the amount of hot water in the tank affecting the auxiliary thermal switch will vary accordingly.

I provide further a continuously operative timing means 45 which includes a continuously operating synchronous motor 47 electrically connected to supply circuit conductors 49 and 51. A worm gear 53 on the shaft of motor 47 engages a worm wheel 55 which is mounted on a shaft 57. The design, construction and operation of the parts of the timer 45 thus far described is that the worm wheel 55 and particularly the shaft 57 will be rotated through one complete turn in a day of twenty-four hours. It is, therefore, to be understood that while I have shown this particular form of continuously operative timer, other constructions effective for the same desired purpose may be utilized.

The shaft 57 has mounted thereon a cam disc 59 which cam disc has a peripheral portion 61 thereof of somewhat larger outer radius than the other portion of the disc. The peripheral extent of the portion 61 is that corresponding to the desired length of an off-peak period and I have shown this duration as that of eight hours. It is to be further understood that the disc 59 may be adjustably mounted on shaft 57 so that the start and therefore the end of an off-peak period, will be that considered proper by the engineers of the central power station supplying electric energy to the supply circuit conductors.

I may provide a second portion 63 having the same outer radius as the portion 61 but extending over a shorter duration and if as indicated by the numerals on disc 59, the main off-peak period extends from 1:00 a. m. to 9:00 a. m., the portion 63 is shown as extending from 1:00 p. m to 4:00 p. m. I provide further a plurality of peripherally spaced lugs or projections 65, 67 and 69 which are shown as positioned at the hours of 7, 9, and 11:00 p. m.

I provide a main timer-controlled switch 71 comprising a relatively rigid contact arm 73 and a resilient contact arm 75 normally yieldingly biased out of engagement with the arm 73 but moved into engagement therewith when a lug 77 of electric-insulating material on the arm 75 engages the parts 61, 63, 65, 67 and 69 of the disc 59 during the rotation of the disc in a clockwise direction, as shown by the arrow on the disc.

I provide further a control member 79 in the form of an electromagnetic contactor or switch including a coil 81 adapted to cause magnetization of a core member 83 having connected therewith a contact bridging member 85 which is adapted to engage a pair of fixed contact members 87 all in a manner well known in the art.

Supply circuit conductor 49 is connected through a conductor 89 to one of the contact members 87 and to contact arm 75. Contact arm 73 is connected by a conductor 91 to the other contact member 87 and also to one terminal of coil 81. The other terminal of coil 81 is connected by a conductor 93 with contact arm 41. The other contact arm 39 of the auxiliary thermal switch 35 is connected by a conductor 95 to contact arm 29 of the main thermal switch 25 which is also connected to one terminal of the heater 21. The other terminal of the heater 21 is connected by a conductor 97 to that fixed contact member 87 electrically connected to one terminal of the coil 81. Contact arm 31 is connected by a conductor 99 with the other supply circuit conductor 51.

The object of my invention, as has already been hereinbefore noted, is to ensure that the tank 11 shall contain, during the daylight hours of a twenty-four hour day, at least a predetermined minimum amount of hot water and that the tank shall contain a full charge of hot water at the start of the daylight hours. The parts of the system and particularly of the continuously operative timer, are shown in the positions which they will respectively occupy at the start of an off-peak period at 1:00 a. m. At this time the main timer-controlled switch 71 will be closed and assuming that there is an appreciable amount of cold water in the tank in the bottom part thereof, an energizing circuit will be closed through the heater 21 as follows: From supply circuit conductor 49, through conductor 89, through engaged contact arms 75 and 73, through conductors 91 and 97 through the heater 21, through engaged contact arms 29 and 31 and from there through conductor 99 to the other supply circuit conductor 51.

Assuming further that the amount of cold water in the tank is sufficient to surround the tubular member 37 of the auxiliary thermal switch, energization of the coil 81 will be effected through a circuit as follows: from supply circuit conductor 49, through conductor 89, through the engaged contact arms 75 and 73, through conductor 91, through coil 81, through conductor 93, through engaged contact arms 41 and 39, through conductor 95 through engaged contact arms 29 and 31 and from there through conductor 99 to the other supply circuit conductor 51. This will cause upward movement of contact bridging member 85 into engagement with the fixed contact members 87 and current may flow through the engaged contact members 85 and 87 and through the rest of the circuit since, as will be evident from Fig. 1 of the drawing, the contact members of the electromagnetic switch 79 are connected in shunt circuit relation to the contact arms 73 and 75.

If it should happen that the amount of hot water in the tank at the start of an off-peak period was sufficient to surround the tubular member 35 at the start of an off-peak period, the above described energizing circuit through coil 81 would not have been established, since contacting arm 41 would be out of engagement with contact arm 39 but this would not have any effect upon the energization of heater 21.

The energization of heater 21 during the off-peak period will continue until substantially all of the water in the tank is hot at which time the main thermal switch 25 will cause disengagement of contact arm 31 from contact arm 29 with resultant deenergization of the heater 21. It may be pointed out that should this deenergization be effected early during the course of an off-peak period and should withdrawals of hot water occur from the tank during the rest of the off-peak period, reenergization of the heater 21 will occur, all in the manner set forth hereinbefore.

When a cam disc 59 has the daytime portion 63 of disc 59 provided thereon, it may be considered to mean that the early afternoon load on the central station is relatively light and that the operators of the central station consider it advisable to provide a second or secondary off-peak period defined by the portion 63 of the disc 59 to ensure that the tank 11 will contain more than the predetermined fractional part of hot water content provided in accordance with the position of the auxiliary thermal switch 35 to meet the probable larger demands for hot water in the later afternoon and in the early evening.

When the first lug 65 engages member 77 on contact arm 75 at say 7:00 p. m., the main timer-actuated switch 71 will be closed momentarily or for a short period of time only and the hereinbefore described energizing circuit through coil 81 will be established if the upper thermal switch 35 is subject to the temperature of cold water surrounding it, that is, the tank 11 contains less than a predetermined fractional amount of hot water relatively to its total content. A holding circuit will be established through coil 81 after disengagement of contact arms 75 and 73, when lug 65 is moved out of engagement with lug 77 to cause disengagement of arm 75 from arm 73. This holding circuit is as follows: From supply circuit conductor 49 through conductor 89, through engaged contact members 87 and 85, through coil 81, through conductor 93, through engaged contact arms 41 and 39, through conductor 95, through engaged contact arms 29 and 31 and from there through conductor 99 to the other supply circuit conductor 51. It will be noted that this holding circuit is independent of the main timer-actuated switch 71 and is controlled by the two thermal switches 35 and 25.

It is evident that if the tank 11 contained a quantity of hot water less than enough to surround the upper thermal switch 35 at the time that lug 65 engaged the main timer-actuated switch 71, energization of the heater 21 would continue until the auxiliary thermal switch 35 is subject to hot water with resultant disengagement of contact arm 41 from contact arm 39 and deenergization of the heater.

I have shown two additional lugs 67 and 69 positioned on the disc 59 to engage member 77 of the timer-actuated switch 71 at 9:00 p. m. and at 11:00 p. m. and the same actions will be effected at these later times as has hereinbefore been described as occurring at 7:00 p. m. It is, of course, obvious that should the tank contain enough water to surround the upper thermal switch 35 at 7:00 p. m., 9:00 p. m., or 11:00 p. m., with attendant disengagement of contact arms 41 and 39, no energizing circuit through heater 21, as above described, would be effected. In other words, if the tank 11 contains at least a predetermined amount of hot water, the electric heater will not be energized.

Referring now to Fig. 2 of the drawing, I have there illustrated a slightly different cam disc 101 having an off-peak portion 103 thereon, of larger outer radius, and shown as extending over only eight hours. The times of day shown on this disc are those which the disc may be considered to occupy in a selected position on the shaft 57 and this off-peak period is shown as extending from 12:00 midnight to 8:00 a. m. Further, instead of an auxiliary or secondary daytime off-peak period, as shown in Fig. 1 of the drawing, I have provided merely a plurality of lugs 105, 107, 109 and 111 on the rest of the periphery of the disc 101, the times corresponding to these lugs being shown as 1:00 p. m., 4:00 p. m., 8:00 p. m., and 10:00 p. m.

In order to provide relatively simple and easily adjustable means on a cam disc, I may point out that the discs 59 and 101 may be made of any suitable material, either metallic or fibrous, having a peripheral surface of constant diameter. Lugs or ears of the kind shown generally by elements 65, 67 and 69 or by elements 105, 107, 109 and 111 may be operatively associated with the individual disc by any suitable or desired securing means and the off-peak period peripheral portions of larger outer radius may be merely in the shape of arcuate strips, either resilient or pre-formed, of the desired duration-effect also easily secured against the periphery of the disc to extend over the desired periods.

Reference may be here made to my copending application Serial No. 365,919, filed November 26, 1940, assigned to the same assignee as is the present application, wherein I have disclosed and claimed the water heating system which is shown herein, not as a part of the present invention, but adapted to be controlled by remotely located means, for example, in a central power station.

The above described continuously operative timing means is therefore effective, when applied to a water heating system of the kind referred to herein, to ensure that the ordinary domestic hot water tank will contain at least a predetermined minimum quantity of hot water during the daytime hours and that the tank will be substantially full of hot water at the start of the daytime period of a day of twenty-four hours.

Various modifications may be made in my invention without departing from the spirit and scope thereof and all such obvious modifications clearly coming within the scope of the appended claims shall be considered to be covered thereby.

I claim as my invention:

1. A water heating system for a hot water tank having a single electric heater adjacent the lower end of the tank, comprising a continuously operative timer, a heater control switch, timer actuated means for selectively causing momentary closure and continuing closure of said switch at different times of day, an electromagnetic heater control switch, a thermally actuable switch responsive to tank water temperature and electric connections between all of said switches, momentary closure of the timer actuated switch causing energization of said heater through said electromagnetic switch in case said thermally actuable switch is responsive to cold water, the energization of said heater continuing until the thermally actuable switch is responsive to hot water and continuing closure of the timer actuated switch causing energization of said heater through said timer actuated switch irrespective of whether said thermally actuable switch is responsive to hot or to cold water.

2. A water heating system for a hot water tank having a single electric heater adjacent to the lower end of the tank, comprising a main and an auxiliary heater circuit, a single control switch for both circuits, a continuously operative timer, means driven by said timer for selectively causing momentary closure of said control switch at spaced times of day and continuing closure of said control switch during a fixed preset time interval at another part of a day, continuing closure of said control switch effecting continuing energization of said heater through the main heater circuit in case less than all of the water in the tank is hot and momentary closure of said control switch effecting continuing energization of the heater through the auxiliary circuit in case less than a predetermined fractional part of the water content of the tank is hot.

3. A water heating system for a hot water tank having an electric heater, comprising a main thermally actuable heater-control switch responsive to tank water temperature and adapted to be held in closed position until substantially all of the water in the tank is hot, a normally-open heater-control switch connected in series circuit with the thermally actuable switch, an electromagnetic switch having its contacts connected in shunt circuit relation with those of the normally open switch, an auxiliary thermally actuable switch responsive to tank water temperature at an intermediate part of the height of the tank, electric circuit connections between the auxiliary and main thermally actuable switches and the electromagnetic and normally-open switch, a continuously-operative timer and a cam disc caused to rotate once in a day and effective to cause momentary closing of the normally-open heater-control switch at one part of a day to effect energization of the heater through said main thermally actuable switch and the electromagnetic switch in case the tank contains such an amount of cold water as to cause the auxiliary thermally actuable switch to be engaged thereby and to continue the energization of the heater until the auxiliary thermally actuable switch is engaged by hot water, said cam disc being effective also to cause closing of the normally-open heater-control switch at another part of a day and to hold it closed for a preset length of time to effect energization of the heater through the main thermally actuable switch and the normally-open heater-control switch in case of the presence of cold water in the tank, said heater energization continuing until substantially all of the water in the tank is hot.

4. A water heating system for a hot water tank having a single electric heater adjacent to the lower end of the tank, comprising a main thermally actuable heater-control switch responsive to tank water temperature and held in closed position until substantially all of the water in the tank is hot, a second heater-control switch in series circuit relation to said main thermally actuable heater-control switch, a second thermally actuable switch responsive to tank water temperature in an upper part of the tank, a continuously operative timer, a normally-open switch adapted to be closed momentarily at different times of a day and for an extended period of time during another part of a day by the timer and electric connections between all of said switches to cause a momentary closure of said normally-open switch by the timer to be jointly effective with said second thermally actuable switch to cause closure of said second heater-control switch and energization of the electric heater in case the second thermally actuable switch is responsive to the temperature of cold water, said energization continuing until said second thermally actuable switch is responsive to the temperature of hot water.

5. A water heating system for a hot water tank having a single electric heater adjacent to the lower end of the tank, comprising a main thermally actuable heater control switch responsive to tank water temperature and held in closed position until substantially all of the water in the tank is hot, an electromagnetic heater-control switch in series circuit relation to said main thermally actuable heater-control switch, a second thermally actuable switch responsive to tank water temperature in an upper part of the tank, a continuously operative timer, a normally open switch adapted to be closed momentarily at different times of a day and for an extended other period of time during a day by the timer and electric connections between all of said switches to cause a momentary closure of said normally-open switch by the timer to be jointly effective with said second thermally actuable switch to cause closure of said electromagnetic heater-control switch and energization of the electric heater in case the second thermally actuable switch is responsive to the temperature of cold water, said energization continuing until said second thermally actuable switch is responsive to the temperature of hot water and to cause a continued closure of said normally-open switch to be jointly effective with said main thermally actuable switch to energize the electric heater in case less than the entire water content of the tank is hot and to continue the energization of the heater during all of said extended period of time in case less than the entire water content of the tank is hot before the end of said extended period of time.

6. A water heating system for a hot water tank having a single electric heater adjacent to the lower end of the tank, comprising a main thermally actuable heater-control switch responsive to tank water temperature and held in closed position until substantially all of the water in the tank is hot, an electromagnetic heater-control switch in series circuit relation to said main thermally actuable heater-control switch, a second thermally actuable switch responsive to tank water temperature in an upper part of the tank, a continuously operative timer, a normally-open switch adapted to be closed momentarily at different times of a day and for an extended other period of time during a day by the timer and electric connections between all of said switches to cause said second thermally actuable switch to prevent closure of said electromagnetic heater-control switch and energization of the electric heater on a momentary closure of said normally open switch by the timer in case the second thermally actuable switch is responsive to the temperature of hot water.

CLARK M. OSTERHELD.